United States Patent [19]

Bullis et al.

[11] 3,743,963

[45] July 3, 1973

[54] TRANSVERSE GAS LASER

[75] Inventors: Robert H. Bullis, Avon; Albert W. Penney, Jr., Glastonbury, both of Conn.

[73] Assignee: United Aircraft Corporation, East Hartford, Conn.

[22] Filed: Sept. 10, 1969

[21] Appl. No.: 857,647

[52] U.S. Cl. .............................................. 331/94.5
[51] Int. Cl. ............................................... H01s 3/08
[58] Field of Search ..................... 331/94.5; 330/4.3

[56] References Cited
UNITED STATES PATENTS
3,577,096  5/1971  Bridges .............................. 331/94.5

OTHER PUBLICATIONS

D. A. Leonard, Laser Focus, 2/67, Design & Use of a U.V. Laser, pg. 26–32.

J. P. Goldborough, APL, Vol. 8, No. 6, pg. 137–139, RG Induction Excitations of CW Visible Laser Transitions in Ionized Gases.

W. E. Bell, APL, Vol. 7, No. 7, Ring Discharge Excitation of Gas Ion Lasers, 10/65, pg. 90–191.

E. F. Labuda, IEEE J. of Q. M. Vol. 1, No. 6, pg. 273–279, Continuous Duty Organ Ion Laser; Herwig, V. A. C. Nuclear Pumping of Gas Laser Systems.

Tiffany, "Desk Size Carbon Dioxide Unit Deliver a K Watt C-W" 9/69, pg. 48–51, Laser Focus.

Primary Examiner—Benjamin A. Borchelt
Assistant Examiner—N. Moskowitz
Attorney—Melvin Pearson Williams

[57] ABSTRACT

A laser employing pre-mixed flowing gases has an electric field and optical gain region which are transverse to flow. In one embodiment, the DC electric field is perpendicular both to flow and to the optical gain path; in another embodiment, the DC electric field is parallel to the optical gain path. Specific embodiments of pre-ionized means to stabilize the DC plasma in large sized or high flow velocity systems include an RF rake, RF pads, wires protected from flow by insulating tubes, and high conductivity seeding.

11 Claims, 9 Drawing Figures

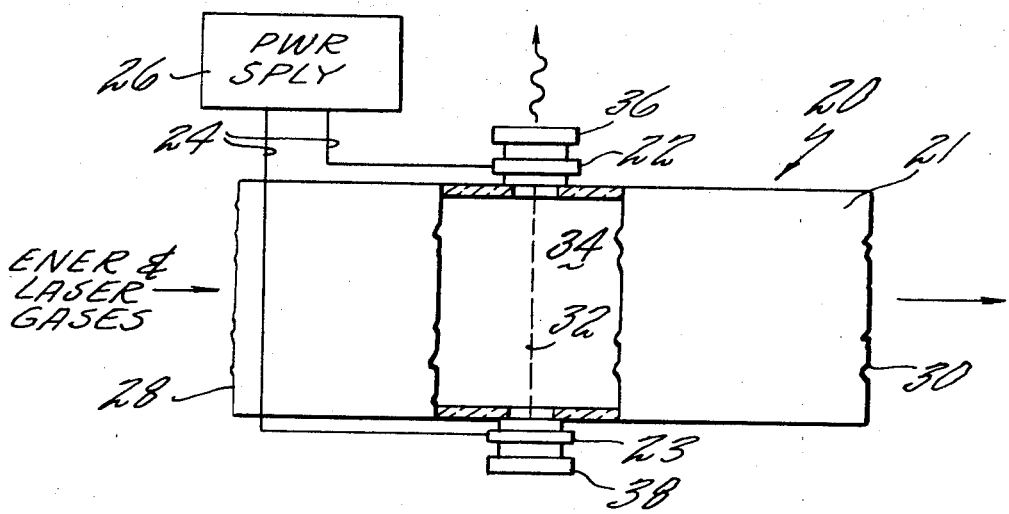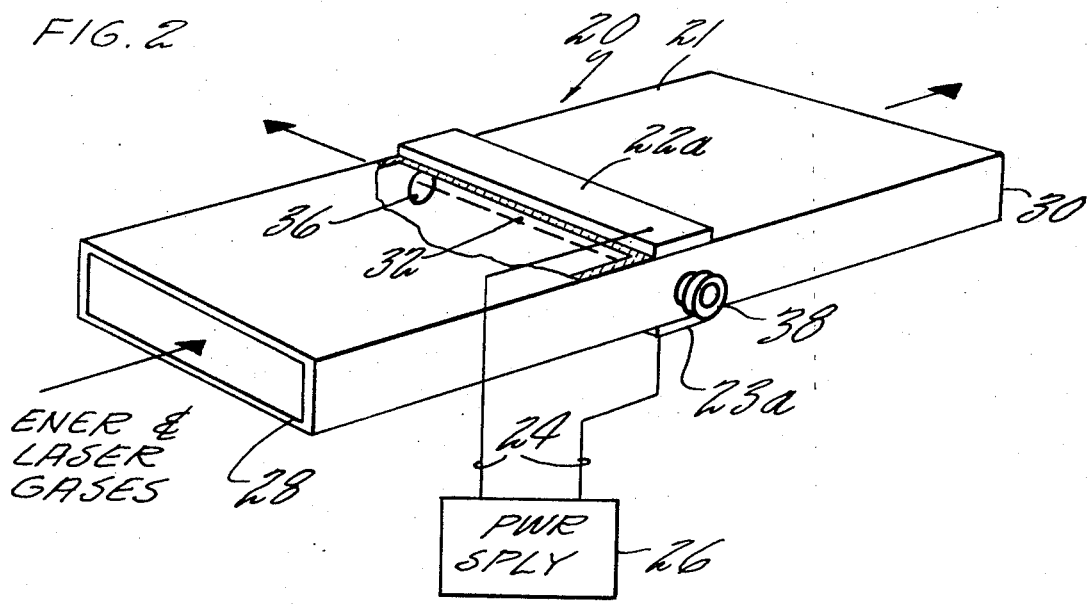

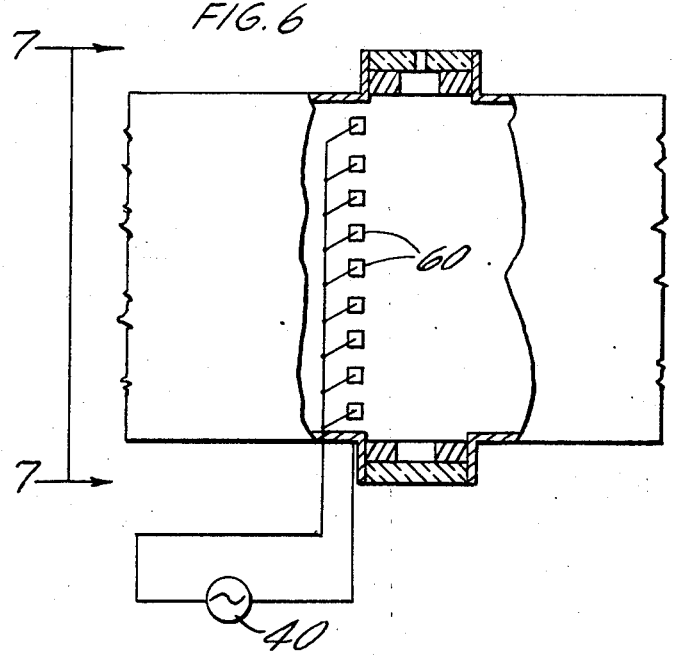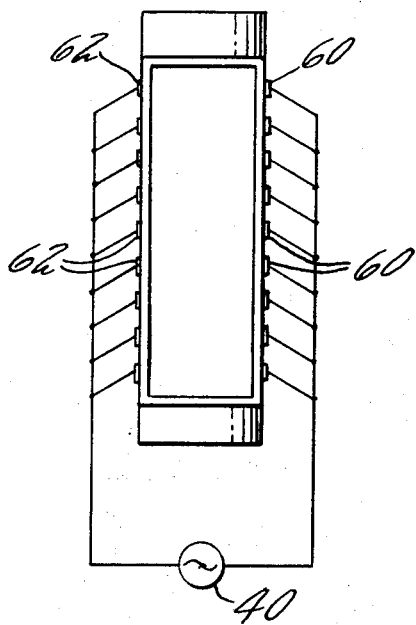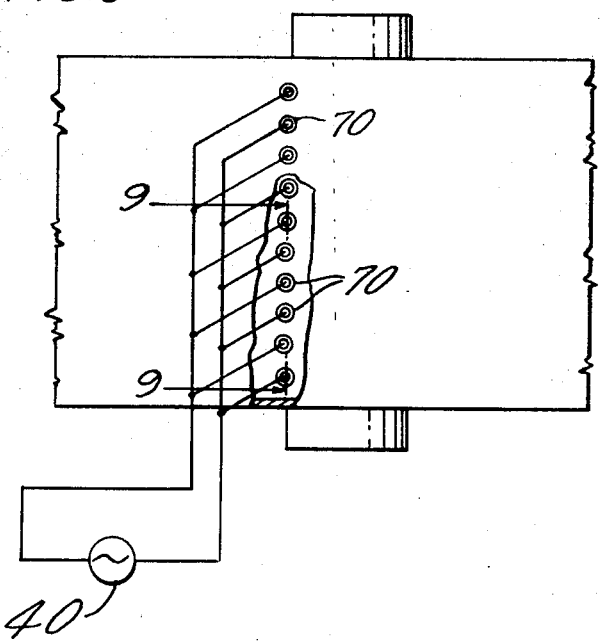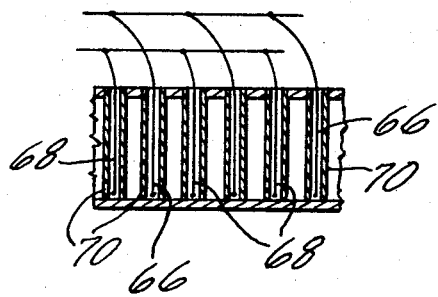

TRANSVERSE GAS LASER

BACKGROUND OF THE INVENTION

1. Field of Invention

This invention relates to gas lasers, and more particularly to a gas laser having a DC electric discharge and optical gain region disposed transversely with respect to flow.

2. Description of the Prior Art

As disclosed in a copending application of the same assignee entitled High Performance Laser, Ser. No. 857,649, filed on even date herewith by Brown and Bullis, high power optical output, including high power density and high specific power, are both enhanced with high mass flow, including a relatively high pressure. As described therein, the ability of an electric discharge plasma to couple power into energy levels useful in providing optical output is enhanced when there is a high loss rate within the electric discharge which promotes a higher electric field thereby permitting higher particle densities. In addition, in molecular gas laser systems, the population differential between the upper laser level and the lower laser level, in steady-state high power operating conditions, may be dependent upon a limiting process between the lower laser level and ground which is very much slower than the rate at which the lower laser level is filled. This is accommodated by maintaining the temperature of the gaseous bath in the optical gain region sufficiently low to keep the population of the bottlenecking state less than a significant fraction of the total lasing gas population. As described therein, this is most readily achieved by transportation of heat through a high rate of mass flow of gases through the optical gain region. Practicing the principles of said copending application requires with flow coaxial with an optical gain path along the length of a laser tube, that a relatively high flow velocity be achieved at a relatively small cross sectional area. Therefore, there are significant boundary layer losses which result in large pressure drops in flowing systems to achieve the flow required for attractive laser operation. Thus, much higher pumping capacity is required in order to achieve a sufficient mass flow at a suitable pressure when the flow through the chamber includes a relatively long length of relatively small cross section. On the other hand, it is obvious that flow characteristics are accommodated to a significant extent if the flow can be carried through the optical cavity transversely thereof so that the flow has to transcent only a relatively short distance through a relatively large cross sectional area. It is also advantageous to have a somewhat long optical gain path transverse to the flow, for maximum gain and power, with a minimum of absorption and dissociation gas products.

Such a flow situation is illustrated in a copending application of the same assignee entitled Gas Laser, Ser. No. 710,696, filed on Feb. 23, 1968, by Pinsley and Brown; the laser disclosed therein is a mixing laser, wherein the lasing gas is introduced into a stream of excited energizing gas at the optical cavity, the energizing gas being pumped in an electric discharge region upstream from the optical cavity. This allows a discharge parallel to flow to be combined with a transverse optical gain region. However, when the lasing gas is pre-mixed, the electric discharge cannot be upstream of the optical gain region since pre-lasing will nearly preclude any useful optical output.

SUMMARY OF INVENTION

The object of the present invention is to provide a cross-flow optical gain region in an electric discharge, pre-mixed gas laser.

According to the present invention, the electric field of a gas laser extends transversely with respect to the direction of the gas flow, the electric field and optical region being substantially coextensive.

In further accord with the present invention, an electric field transverse to the flow of a gas laser is provided with electric discharge plasma stabilization. In still further accord with the present invention, the electric discharge stabilization includes pre-ionization of the gas as it enters the electric discharge excitation region. In accordance with the present invention, pre-ionization is achieved by means of an RF electric discharge, which may be of relatively low power consumption in contrast with the DC excitation discharge. In accordance further with the present invention, pre-ionization stabilization of the DC electric plasma is enhanced by seeding with a low ionization potential substance, such as an alkali metal.

The present invention provides a flowing gas laser which substantially improves high optical power output operation.

Other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a partially broken away, semi-schematic simplified plan view of a first simple embodiment of the present invention;

FIG. 2 is a partially broken away, semi-schematic, simplified perspective view of a second simple embodiment of the present invention;

FIG. 6 is a simplified, semi-schematic partially broken away plan view of another embodiment of the present invention utilizing painted RF electrodes for pre-ionization plasma stabilization;

FIG. 7 is a section taken on the line 7—7 of FIG. 6 illustrating the manner of connection of the electrode thereof;

FIG. 8 is a simplified, semi-schematic partially broken away plan view of another embodiment of the present invention utilizing encapsulated wire RF pre-ionization electrodes; and FIG. 9 is a section taken on the line 9—9 of FIG. 8 illustrating the configuration of the encapsulated wire electrodes thereof.

DESCRIPTION OF THE PREFERRED EMBODIMENT

Figure 3:
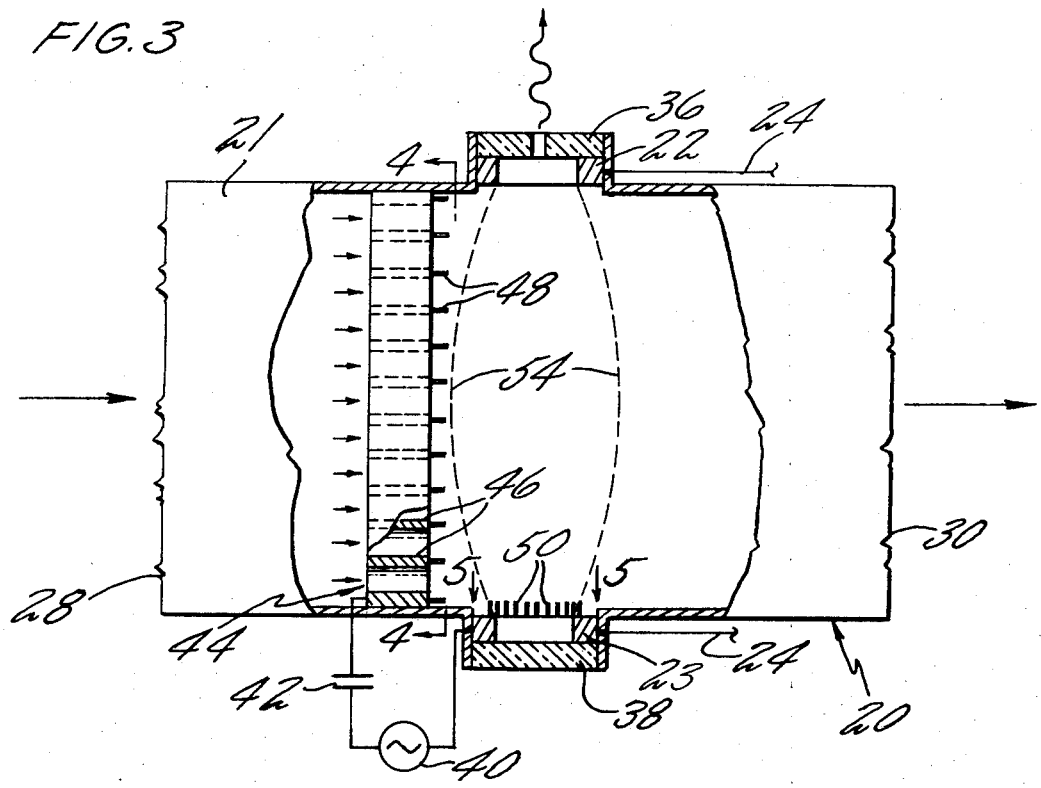
FIG. 3 is a simplified, semi-schematic partially broken away plan view of an embodiment of the invention using up-stream RF pre-ionization plasma stabilization.

Referring now to FIG. 1, the broadest aspects of the present invention are embodied in a transverse flowing gas laser comprising generally a laser flow chamber 20 having a cover 21 (partially broken away) which may preferably be comprised of quartz or other suitable insulating material capable of withstanding moderately high temperatures. As depicted in FIG. 1, this configuration is orthogonal, having a portion of the top broken away to reveal the attachment thereto of a pair of DC electrodes 22, 23 which are connected by suitable wires 24 to a suitable high voltage DC power supply 26. The DC electrodes 22, 23 are disposed transversely with respect to the flow of gases, which may enter one end 28 of the flow chamber 20 and depart from the other end 30 thereof. As is known in the art, the end 30 of the flow chamber 20 may be attached to a suitable exhaust system so as to induce flow at the proper pressure and flow velocity through the flow chamber 20. On the other hand, this exhaust system may be fed back so as to provide a closed-loop system as disclosed in a copending application of the same assignee entitled Extended Closed Cycle Gas Laser System, Ser. No. 857,646 filed on even date herewith by Biancardi and Melikian. The DC electrodes 22, 23 are also aligned axially with respect to an optical gain path 32 which is within a region of optical gain 34 between a pair of optical cavity mirrors 36, 38. As is known in the art, one of the mirrors 36, 38 may be provided with a partially transmitting characteristic, or with an optical output extraction aperture in order to provide useful optical output from the system. On the other hand, the optical gain region 34 may be utilized, as is known in the art, as an amplification region by providing optical input and output windows with a suitable mirror structure to provide a desired number of passes through the optical gain region 34. In any event, it is considered in the descriptions given hereinafter that the optical gain region includes at least one or more optical gain paths 32 which are at least substantially transverse to the flow.

A modification of the simple cross-discharge embodiment of FIG. 1 is illustrated in FIG. 2. Therein, a pair of DC electrodes 22a, 23a are disposed parallel with the optical gain path 32 and transversely with respect to flow. This provides an electric field which is transverse with respect to the optical gain path 32 as well as transverse with respect to the flow. In contrast, the electric field in the embodiment of FIG. 1 is parallel with the optical gain path 32 and transverse with respect to the flow. The embodiment of FIG. 2 has the advantage over the embodiment of FIG. 1 that a more uniform field distribution is obtainable across a greater proportion of the mass flow through the electric field and possible discharge degradation of the optical mirrors is eliminated.

The embodiments of FIGS. 1 and 2 are useful in cases where the flow velocity is small with respect to the drift velocity of ions generated within the electric field region. Since the ions in typical molecular gas discharges of interest have a drift velocity on the order of 1 meter per second, these embodiments are useful for flow velocities which are only a few meters per second, wherein the flow field kinetics do not dominate the charged particle kinetics. These systems are operable at higher velocities in dependence upon more limited cross sectional areas, but at lower velocities in the case where the cross sectional areas are larger. This occurs since the velocity at the boundary can be substantially lower than the velocity in the center of the stream. Thus, if the configuration is relatively wide and flat, having a very narrow dimension as illustrated in FIG. 2, then the boundary flow conditions comprise a significant proportion of the flow and tend to stabilize operation at slightly higher velocities than would be true if the cross sectional area were more nearly square, or larger in cross sectional dimensions.

The embodiments of FIG. 1 and FIG. 2 are not useful for large scale lasers or for lasers operating with high flow velocities since there is a very strong tendency for the gas kinetics to blow the plasma downstream so that it either becomes extinguished, or has an insufficient portion within the optical gain region to provide any meaningful gain or useful power output. Blowing of the plasma downstream is due to collisions between the neutral particles within the gas flow with ions drifting toward the cathode. Since the effect of energy transfer in these collisions is proportional to the ratio of masses of the colliding particles, and since the neutral particles and the ions have substantially equal mass in a typical gas mixture (such as $CO_2-N_2-He$), the ions are imparted with a significant downstream velocity in contrast with the drift velocity. As the ions are forced by the collisional kinetics associated with the flow field away from the optimum electric field region, (which corresponds with the shortest distance across the optical gain path) they cause a lack of electronic neutrality in this region, therefore causing an electric field to be established between the ions which have been blown downstream and the electrons which initially tend to remain within this optimum region. This electronic attraction, the seeking of electronic neutrality, causes the kinetically driven downstream ions to attract the electrons out of the optimum region. Thus, the plasma tends to move downstream in the flow direction, and the optical gain region ceases to have sufficient ionization so as to maintain the plasma. It is known that the electrons themselves are not overly affected by the flow, since the energy imparted to them in a momentum transfer collision with a neutral particle is proportional to the ratio of the mass of the electron to the mass of the neutral particle with which it collides. This ratio is typically on the order of $10^{-6}$ or $10^{-7}$. Thus, on the average, electrons themselves would not be too adversely affected if it weren't for the need to maintain electronic neutrality in the plasma.

With the foregoing in mind, in order to promote operation of the present invention at high flow velocities, or in physical configurations in which the boundary flow conditions are relatively insignificant compared with the effect that the total flow has on kinetic acceleration of ions downstream of the electric field region, plasma stabilization means of various sorts are provided by the present invention.

Figure 4:
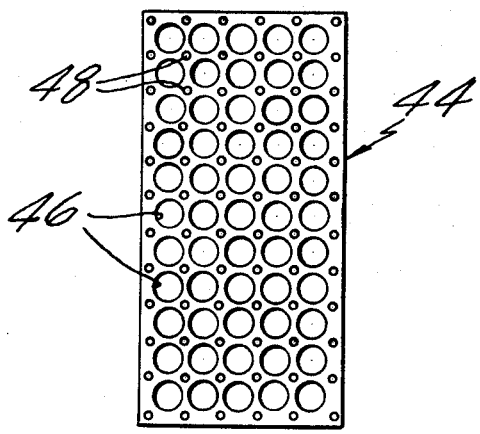
FIG. 4 is a section taken on the line 4—4 of FIG. 3, illustrating an exemplary RF pre-ionization electrode set.
Figure 5:
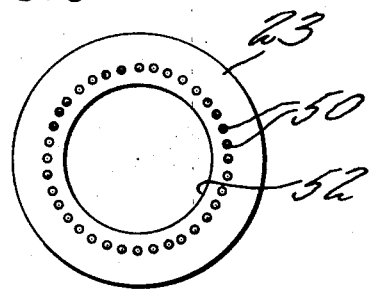
FIG. 5 is a section taken on the line 5—5 in FIG. 3, showing an illustrative brush cathode for the DC discharge.

Referring now to FIGS. 3-5, RF pre-ionization is provided by a source 40 of RF voltage coupled through a capacitor 42 to an RF rake 44 which includes a plurality of passages 46 interspersed with sharp points 48, to increase the RF electric field strength at the points and thus decrease the RF power required to produce the pre-ionization needed. As shown in more detail in FIG. 4, the RF rake 44 may be fabricated completely of metal, or may comprise a glass or plastic base having metallic points 48 and including a metallic coating to electrically interconnect the points. In the embodiment of FIGS. 3-5, the RF rake has a tendency to shunt the DC plasma if it is positioned too closely to the DC plasma. This can be partially avoided by providing a basic structure of an insulating material, and segmented conduction paths to the rake points which are substantially transverse to the plasma, thus providing a much higher electrical impedance in a direction parallel with the DC electric field. To refer the RF plasma to the DC plasma, the ground plane of the RF voltage 40 is returned to the cathode 23, which may take the form of a brush cathode (FIG. 5) including a plurality of conductive filaments 50 disposed on an annular conductive structure having a hole 52 therein to permit the passage of laser radiation therethrough. The anode 22 may similarly comprise an annular conductive ring.

The capacitor 42 permits RF coupling of the source 40 to the DC plasma formed by the provision of a suitable electric field between the anode 22 and the cathode 23, without DC coupling therebetween. The RF rake 44 causes RF ionization of the gas flow to some suitable, small extent just upstream of the electric field region, which is the region between the anode 22 and the cathode 23. The ions and electrons thus produced upstream of the region where a DC plasma is desired, replace the ions which are forced predominately downstream by acceleration due to collisions with the neutral particles that comprise the flow field, and the electrons which are electronically attracted downstream by the ions. Thus, in the steady-state condition, some portion of ions and electrons within the region of the DC plasma (as schematically outlined by the dotted lines 54) flow out in the downstream direction and are replenished by an equal number of ions and electrons created by the RF rake 44 flowing into the plasma. It should be noted that the number of ions and electrons which must be produced by the stabilization means (such as the RF rake 44) is much less than the total number that must be present within the plasma for the excitation of a larger number of upper laser level states in the lasing gas and/or in an additional gas useful in promoting the excitation of upper laser levels of the lasing gas (such as nitrogen when used with carbon dioxide). This is true because the loss of ions due to flow effects at any one time although significant from stability considerations is small in comparison to the total plasma density. Thus, the power input which must be supplied through the RF pre-ionization means is significantly less than the main electrical input power which is supplied to the DC electric field for coupling into the gases. In fact, the RF power required has typically been found to be one hundreth of the DC power.

The embodiment of FIG. 3 necessarily includes a relatively significant flow impedance. An embodiment which provides no mechanical impedance to the flow of gases through the electric field and optical gain regions is illustrated in FIGS. 6 and 7. Therein, the RF source 40 is coupled to respective sets of electrodes 60, 62 so that an RF field is developed from top to bottom, transversely with respect to the flow between the respective electrode sets 60, 62. The electrodes 60, 62 may comprise metallic pieces disposed on the quartz wall or other suitable RF insulating material of the laser conduit 20, or may comprise pads of metallic paint disposed on the wall, fine wires being joined to the electrodes by being disposed in the paint while wet, thereby adhering to it after it dries. Other suitable electrode arrangements could similarly be disposed on opposite walls. The electrodes 60, 62 may be considered to be a pair of segmented electrodes; the segmentation is required to prevent short-circuiting of the DC discharge through high conductivity concentrations of the RF plasma, which are generated in the boundary layer immediately adjacent to the RF electrode. The embodiment of FIGS. 6 and 7 obviously has the advantage of providing no impediment to flow, thereby further enhancing the low flow loss, high mass flow capability at low pressure drop of a transverse laser in accordance with the present invention. However, there is a limit to the permissible distance between electrode sets in this configuration.

Another embodiment of the present invention, which does not provide a significant impedance to gas flow, is illustrated in FIG. 8. Therein, the RF source 40 is connected to two sets of wires 66, 68, alternate ones being coupled together to respective outputs of the source 40. Each of the wires 66, 68 is encapsulated within insulation material, such as a coating or tube 70 of quartz, which capacitively coupled the RF to the DC plasma while providing DC insulation. Further, the tubes 70 may comprise faired structures to enhance laminar flow of the gases within the chamber 20. Each of the wires 66, 68 is provided with a metallic bead 72 on its distal end to prevent field concentrations from occurring thereat, thus to protect against concentrating all of the RF field between the ends of adjacent wires and to avoid high RF power concentrations that could tend at these points to melt the quartz or other materials of the adjacent structures. Thus, Rf ionization in the embodiment of FIGS. 8 and 9 occurs between adjacent RF electrodes 66, 68. Further the tubes 70 may comprise faired structures to enhance laminar flow of the gases within the chamber 20, and also to thereby improving the optical quality of the laser plasma produced.

This embodiment has the advantages of relatively low cost, high degree of control over the RF plasma, a reliable structure which is not unduly affected in high power operation, and it can be utilized without regard to the longitudinal dimension of the wires 66, 68 or overall cross sectional dimensions. In contrast, the embodiment of FIGS. 6 and 7 is useful only so long as the distance across the flow chamber 20 is not too great to permit a properly stabilized RF field to exist between the electrodes 60, 62. Of course, the embodiment of FIGS. 3-5 also may be scaled to a substantially large size flow chamber 20 without incurring the problem of the embodiment of FIGS. 6 and 7, but at the expense of a slightly higher pressure drop in the system.

In all of the embodiments herein which employ discharge stabilization means, the means may be positioned in proximity with the upstream edge of the desired DC discharge. The preferred location varies according to the magnitude of the RF field, the velocity and the pressure. With an increase in either velocity or pressure, the pre-ionization means is preferably disposed more closely to the desired position of the DC discharge. As either velocity or pressure is decreased, the separation between the two is preferably increased. The positioning of the various electrodes is critical only in the following respects. Since boundary flow conditions maintain a given unit of gas within the influence of the plasma source for a greater length of time that that of the free system, the gas flow near the walls of the laser flow chamber 20 is at a higher temperature than in the main stream. At the higher temperature, it is more likely that the RF excitation will become coupled to the DC excitation since there is a greater tendency for electrical breakdown to occur in this hot gas region in the boundary layer than in cool gas of the free stream. Thus care must be taken in design of this structure to avoid direct continuous DC coupling to this boundary layer plasma region. This is usually accomplished through segmentation of the Rf electrode configuration. The orientation of the electrodes may also be switched 90° in the embodiments of FIGS. 3–5 and FIGS. 8 and 9, provided care is taken not to allow DC plasma coupling to the boundary layer plasma.

Pre-ionization to stabilize the DC electric discharge plasma may be enhanced by the use of a low ionization potential substance, such as an alkali metal. One such substance comprises gaseous cesium. This may be introduced into the gas stream by a separate inlet just upstream of the DC electric discharge, or it may on the other hand be introduced with the other gases. Thus, in FIG. 1, the inlet end 28 of the flow chamber 20 may comprise means for introducing a low ionization potential substance into the gas flow upstream of the laser chamber. On the other hand, the cesium or other low ionization material would be more effective in an embodiment including electronic stabilization of the type referred to in the embodiments of FIGS. 3–9 herein. In such case, the low ionization material may be separately introduced just upstream of the optical gain region ot it may be introduced through the inlet end 28 of the laser chamber.

It is to be noted that the RF pre-ionization means is advantageous in that it produces sufficient upstream ionization to compensate for the downstream losses without significant heating of the gas. This is in contrast, for instance, to upstream ionization that could be achieved by using a plurality of DC spark plugs. Spark plugs would provide the necessary ionization, but also heat the gas to a point that renders it difficult to maintain a proper DC plasma for maximum upper level excitation, and the heat added thereby would significantly add to low-level bottleneck problems.

One advantage of the present invention is that it permits high power operation at relatively low flow velocities, and at minimum pressure drops which is an obviously inherent advantage in system design. Additionally, any laser employing the present invention, even at higher velocity, achieves significant improvements in power density, specific power and efficiency. The advantages of the transverse laser in accordance herewith are that heat rejection from the optical gain region is accomplished with high mass flows at low velocity which substantially reduces the need for a high specific conductivity relaxant gas (such as helium) and permit use of a far more selective relaxant such as water vapor. It therefore aids in achieving high laser power in accordance with the teachings of said copending application. Additionally, the amount of relaxant, of any type, can be substantially reduced in contrast with coaxial or other laser configurations because heat rejection is accomplished with mass flow and is not strongly dependent on the thermal conductivity of the working fluid as in other configurations. In all, the desirable characteristics of high power, high efficiency lasers are enhanced with the present invention.

Although the invention has been shown and described with respect to preferred embodiments thereof, it should be understood by those skilled in the art that the foregoing and other changes and omissions in the form and detail thereof may be made therein without departing from the spirit and scope of the invention.

Having thus described typical embodiments of our invention, that which we claim as new and desire to secure by Letters Patent of the United States is:

1. A flowing gas laser comprising:
   a laser chamber including an optical gain region having an optical gain path;
   means for flowing gases useful in the production of laser output power through said optical gain region substantially transversely of said optical gain path; and
   means producing a direct current continuous operation electric discharge plasma in said optical gain region with an electric field gradient oriented transversely with respect to said flow, said plasma being oriented with its electric field gradient substantially parallel with said optical gain path.

2. The gas laser according to claim 1 including means for stabilizing the electric discharge plasma against the effects of the flow of gases.

3. A flowing gas laser comprising:
   a laser chamber including an optical gain region having an optical gain path;
   means for flowing gases useful in the production of laser output power through said optical gain region substantially transversely of said optical gain path;
   means producing a direct current continuous operation electric discharge plasma in said optical gain region with an electric field gradient oriented transversely with respect to said flow; and means for stabilizing the electric discharge plasma against the effects of the flow of gasses.

4. The gas laser according to claim 3 wherein said stabilizing means comprises means for ionizing the gases flowing through said laser upstream of the point of entry thereof into said optical gain region.

5. The laser according to claim 4 wherein said pre-ionization means includes means to introduce a low ionization potential substance in the gas flow upstream of said optical gain region.

6. The laser according to claim 4 wherein said ionization means comprises RF plasma generating means.

7. The laser according to claim 6 wherein said RF plasma means includes a metallic rake disposed in the path of flowing gases upstream of the optical gain region and having gas passages therethrough.

8. The laser according to claim 7 including means for capacitively coupling an RF excitation voltage between said RF rake and one of the electrodes of said electric discharge plasma.

9. The laser according to claim 6 wherein said RF plasma means comprises a pair of segmented electrodes disposed on respective opposite sides of said laser chamber with means for applying RF excitation voltage therebetween.

10. The laser according to claim 6 wherein said RF plasma means comprises a plurality of insulated electrodes disposed in the flow of gases upstream of the optical gain region.

11. The laser according to claim 10 wherein alternate ones of adjacent electrodes are connected together so as to provide an interleaved set, and means impressing an RF excitation voltage between said sets.

* * * * *